United States Patent

[11] 3,628,049

[72] Inventor Andreas Jasper
Munich, Germany

[21] Appl. No. 8,669

[22] Filed Feb. 4, 1970

[45] Patented Dec. 14, 1971

[73] Assignee Messerschmitt-Bolkow-Blohm GmbH
Munich, Germany

[32] Priority Feb. 7, 1969

[33] Germany

[31] P 19 06 154.2

[54] PROGRAMMABLE SELECTOR SWITCH
7 Claims, 1 Drawing Fig.

[52] U.S. Cl. .................................................. 307/252 J, 307/252 H, 307/252 K, 340/166

[51] Int. Cl. .................................................. H03k 17/00

[50] Field of Search .......................................... 307/37, 38, 241, 242, 252 H, 252 J, 252 K, 318; 317/137; 340/166

[56] References Cited

UNITED STATES PATENTS 3,292,036 12/1966 Colton et al. ................. 307/252 X

*Primary Examiner*—Donald D. Forrer

*Assistant Examiner*—John Zazworsky

*Attorney*—Woodhams, Blanchard and Flynn

ABSTRACT: Switching method and apparatus for activating a selected one or ones of the plurality of loads. A plurality of load groups are each connected through a Zener diode to a power source. Each load group comprises a plurality of loads connected through respective electronic switches and said Zener diode to said source, said Zener diode normally holding said loads unenergized regardless of the condition of the electronic switch. Said Zener diode is bypassed by a selectable switch which when closed places electric potential across the electronic switches and said loads. A plurality of selectively energizeable control lines are provided and are selectably energizeable for controlling said electronic switches. By energizing selected ones of said control lines and by closing selected ones of said selectable switches, any desired pattern of said loads may be energized.

Patented Dec. 14, 1971 3,628,049
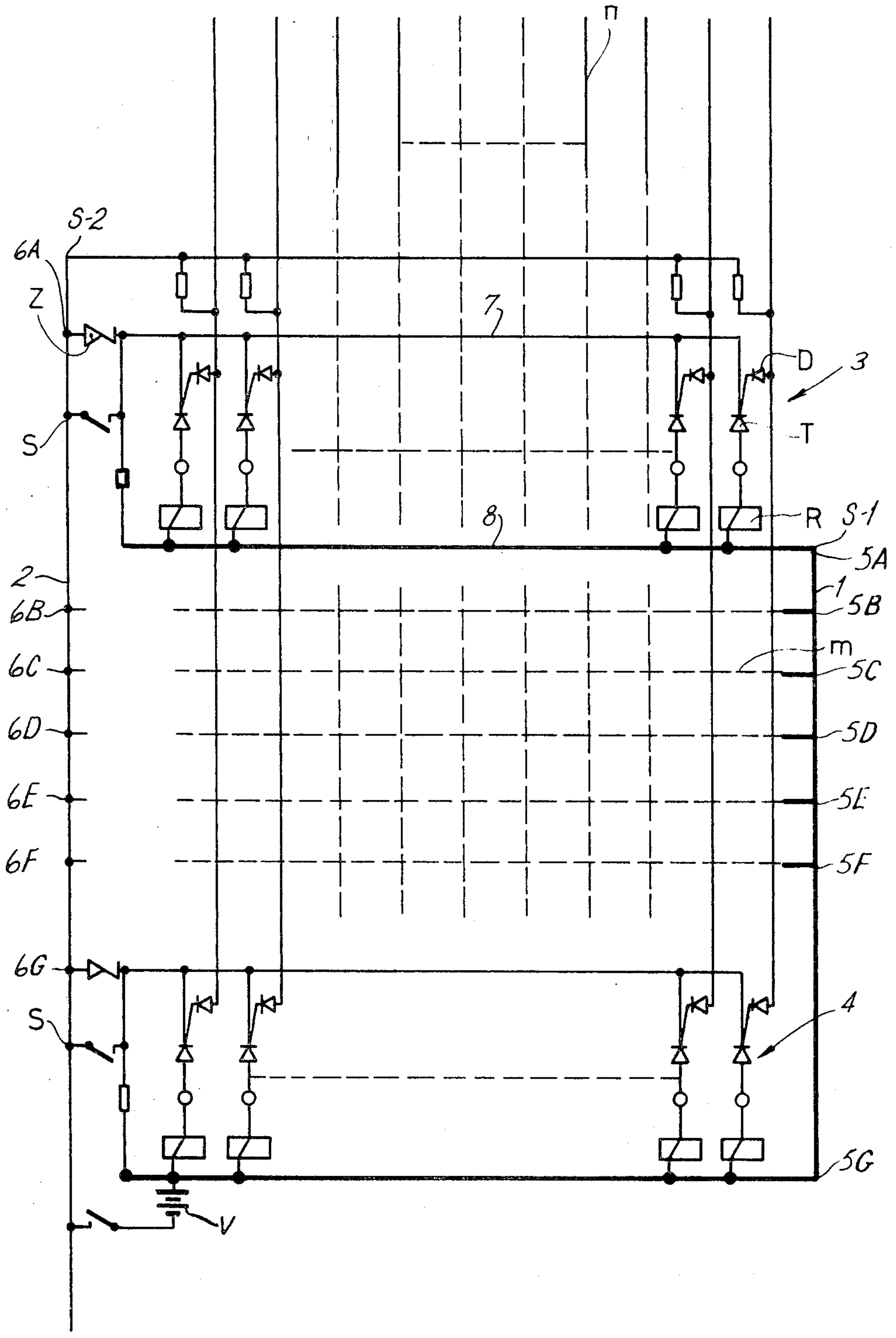
INVENTOR
ANDREAS JASPER
BY Wodhams, Blanchard & Flynn
ATTORNEYS

PROGRAMMABLE SELECTOR SWITCH

The invention relates to a programmable selector switch for any possible given combination of selections. The applicable selector switches of the prior art, can be subdivided into two basic types; viz mechanical and electronic systems. The former include step-by-step switches, bank-and-wiper switches, crossbar switches, etc., such as are primarily used in telephone engineering. Mechanical selector switches are well arranged and operate with relatively high accuracy and safety. Simultaneous switching of several contacts in random selection is, however, not possible and extension of applicable mechanical devices is possible only to a limited degree. Size and weight are relatively great and decentralization is possible only to a limited degree. In addition to this there is a certain susceptibility to failure due to vibration, wear, contamination and central leading of wiring.

A description of an applicable electronic switching system is contained in the German Pat. application No. 1,108,784. The switchboard gallery herein described for control of several switches is characterized by the following: a control frequency is assigned to each switch; this control frequency is initially transmitted to a relay chain, which is not frequency-dependent; this relay chain energizes the next relay until another auxiliary contact of one of these relays has connected that frequncy-dependent relay associated with the frequency of the switch to be selected; using its control contact that frequency-dependent relay interrupts further activation of the relay chain by means of an auxiliary contact and establishes the connection between the control receipt switch and the controlling switch, the frequency-dependent relays being so tuned that they react only to their assigned frequency or to a lower frequency.

The above-described system which operates with control frequencies uses an elaborate, complicated mode of centrally controlling several switches and is therefore susceptible to trouble.

As far as prior art is concerned, German Pat. application No. 1,229,144, deals with a circuit arrangement for the conversion of an *n*-level code into a singular significance with a diode matrix. In this case the singular significances are assigned line conductors, whereas their *n* divided-conductor pairs, which are connected to the line conductors according to code and which conduct inverse potentials within each pair, as assigned to the *n* input conductors.

Finally, the article "The Zener diode and its use in measuring techniques" by W. Niegel which was published in the periodical "Archive for Technical Measuring" in Oct. 1962, notes that the advantage of the Zener diode as a selective member in relay circuits is obvious.

Proceeding therefore on the basis of a programmable selector switch for any desired combination of selections, consisting of a switching matrix with *n* times *m* junctions or contact possibilities arranged as coordinates, which result from *n* control lines and *m* load series, each junction being connected, for example to a relay or to another load, the application is directed basically toward the following features. The disadvantages connected with the above described devices are eliminated and a programmable selector switch is provided which has a more simple construction with special and improved extension possibilities, which is altogether more reliable and operates faster than mechanical systems.

The object according to the invention is achieved through the following combination of features:

a. each relay or load system is connected in series to a Zener diode, b. each load is assigned a semiconductor element with two stable conductance modes, which serves as a storage element, and c. each load is connected with the control lines by means of a thyristor and a Zener diode.

According to the invention, setting of the applicable relay or response of the applicable load consists, for example, of the following three steps:

1. shunting of the Zener diode in the horizontal path *m*, which contains, for example, the relay(s) to be set, 2. applying a positive control signal in order to fire the thyristor which serves as a storage element for the relay to be set, and 3. opening the Zener diode shunting in order to deactivate the horizontal path *m*, i.e. to protect the thyristors in this series against random firing.

Steps 1 and 2 can take place simultaneously.

The invention permits random selection and switching of a random number of contacts in an easily extendable switching matrix by simple means. Through multiple use of the selection elements and through the fact that the function units "storage element" and "driving amplifier" are comprised in a single uniform semiconductor element, (e.g., by series-connecting a bistable multivibrator, a transistor amplifier and a relay coil) considerable reduction of expenditure is achieved as compared with conventional arrangements.

When, for example, a conventional switch with 300 contacts is used, the invention could reduce the price by a factor of 10.

The switching matrix according to the invention can be controlled either by constant direct voltages or by pulses.

The selection principle uses either the current, e.g. by means of relay coils, or the voltage by means of voltage drops in any of the loads.

To prevent interference pulses, which may result from accidental firing of a thyristor, from influencing the thyristors of another series, the individual thyristors are connected to the control lines by means of diodes.

The following diagram illustrates the invention in graphic form.

A pair of bus lines 1 and 2 are connected respectively to the two sides S–1 and S–2 of any convenient source V of power. The lines "*n*" are connected to any desired sources of control potential and the switches S are independently and selectively operated from an external means as desired.

Load groups of which two are indicated at 3 and 4 are provided between each of the terminals 5A–5G on the one side and 6A–6G on the other side. Each load group consists of bus conductors 7 and 8, the conductor 7 being connected to the terminal 6A and the conductor 8 being connected to the terminal 5A. Each of the loads are connected at one of its respective sides to the conductor 8 and on the other respective sides through thyristors T to the conductor 7.

The load group 4 is constructed the same as the load group 3 and each of the load groups between the respective terminals 5B–6B, 5C–6C, 5D–6D, 5E–6E, and 5F–6F are likewise constructed similarly.

In operation it will be apparent that so long as the switches S are open none of the loads will be activated regardless of the condition of the control lines "*n*." However, by closing one of the switches S and thereby shunting the Zener Z associated therewith a load group may be energized such that upon appropriate energization of selected ones of the control lines "*n*" corresponding ones of the thyristors T will be made conductive and the corresponding load R will thereby be energized. Thus by the appropriate selection of certain switches S for closing and certain control lines "*n*" for energization, any desired pattern of loads may be simultaneously and immediately energized. It will be observed that a given control line "*n*" will energize only those loads in a load group whose switch S is closed and will have no effect upon a load in a load group whose switch S is open.

The diodes prevent a potential from one control line feeding into an adjacent control line and thereby improperly energizing a control line whose energization is not desired.

The loads are in this embodiment indicated as relays for energizing other circuits but it will be recognized that they can be loads of any desired kind.

The embodiments of the invention in which an exclusive property or privilege is claimed are defined as follows:

1. A programmable switching system for energizing selected one or ones of a plurality of loads, comprising:

a pair of source conductors having a potential difference therebetween;

at least one load group arranged between said conductors, said load group consisting of firs and second bus conductors connected respectively to one of said source conductors and one thereof being so connected through a Zener diode;

a selectively operable switch shunting said diode;

each load individually connected between said bus conductors through a respective serially connected electronic switch;

a plurality of control conductors each connected to a respective one of said electronic switches for changing the states thereof upon a change in potential applied to a respective control conductor; and whereby, upon closing said selectable switch and energizing selected one or ones of said control conductors a selected pattern of said loads may be energized.

2. The device defined in claim 1 including a plurality of load groups arranged between said source conductors and each thereof having an independently operable selectable switch bypassing the Zener diode associated therewith.

3. The device defined in claim 1 including a plurality of load groups arranged between said source conductors and each thereof having an independently operable selectable switch bypassing the Zener diode associated therewith wherein each of said control conductors is connected to a single electronic switch in each of a plurality of said load groups, whereby the energization of selected one or ones of said control conductors and the closing of selected one or ones of said selectable switches will energize a desired selection of loads.

4. The device defined in claim 1 wherein said electronic switches are each connected to the control conductor associated therewith through a diode.

5. The device defined in claim 1 wherein aid electronic switches are thyristors.

6. A programmable switching system for energizing selected one or ones of a plurality of loads, comprising:

first and second source conductors having a potential difference therebetween;

at least one load group arranged between said first and second source conductors, said load group comprising first and second bus conductors connected respectively to one of said source conductors, said first bus conductor being connected through a Zener diode to said first source conductor;

each load individually connected between said first and second bus conductors through a respective serially connected electronic switch;

a selectively operable switching means for providing a shunt between the end of said series connected load and electronic switch remote from said second bus conductor and said first source conductor;

a plurality of control conductors each connected to a respective one of said electronic switches for changing the state thereof upon a change in potential applied to a respective control conductor; and whereby upon closing said selectable switch means and energizing selected one or ones of said control conductors, a selected pattern of said loads may be energized.

7. A switching system for energizing a load, comprising;

first and second source conductors having a potential difference therebetween;

first and second bus conductors, said first bus conductor being connected to said first source conductor and said second bus conductor being connected through a Zener diode to said second source conductor;

a load connected between said first and second bus conductors through a serially connected electronic switch;

selectively operable switching means for providing a shunt between the end of said series connected load and electronic switch remote from said first bus conductor and said second source conductor;

a control conductor connected to said electronic switch for changing the state thereof upon a change in potential applied to said control conductor; and whereby, upon losing said selectable switch means and energizing said control conductor, said load may be energized.

* * * * *